United States Patent [19]

Meyer

[11] 4,422,019
[45] Dec. 20, 1983

[54] APPARATUS FOR PROVIDING VERTICAL AS WELL AS HORIZONTAL SMOOTHING OF CONVERGENCE CORRECTION SIGNALS IN A DIGITAL CONVERGENCE SYSTEM

[75] Inventor: William W. Meyer, Oregon City, Oreg.

[73] Assignee: Tektronix, Inc., Beaverton, Oreg.

[21] Appl. No.: 397,615

[22] Filed: Jul. 12, 1982

[51] Int. Cl.³ .................. H01J 29/70; H01J 29/76
[52] U.S. Cl. .................................. 315/368; 315/13 C
[58] Field of Search .............. 315/368, 13 C; 358/10

[56]  References Cited
U.S. PATENT DOCUMENTS 4,316,211  2/1982  Mackey et al. .................. 358/10
4,354,243  10/1982  Ryan et al. ....................... 358/10

Primary Examiner—Theodore M. Blum
Attorney, Agent, or Firm—John H. Bouchard; Allston L. Jones

[57] ABSTRACT

An apparatus of providing vertical smoothing of convergence correction signals in a digital convergence system is disclosed. The surface of a cathode ray tube is subdivided into a matrix including a plurality of intersecting rows and columns and having a plurality of intersections corresponding thereto. A value is assigned to each intersection of a row and a column of said matrix. An electron beam traces a plurality of scan lines within each of the rows of the matrix. For each scan line within a row of the matrix, a convergence correction signal is synthesized using the plurality of values associated with the plurality of intersections in said row. A plurality of horizontal discontinuities are present in the convergence correction signal as a result of the different magnitudes associated with the plurality of values used to synthesize the convergence correction signal. Using conventional filtering techniques, the impact of the horizontal discontinuities in the convergence correction signal may be minimized thereby providing horizontal smoothing of the convergence correction signal. When the electron beam begins tracing the plurality of scan lines in the next, subsequent row of the matrix, a vertical discontinuity is produced, i.e., a gap or an overlap between groups of scan lines traced by the electron beam. The impact of these vertical discontinuities can be minimized by providing vertical smoothing of the convergence correction signal. This vertical smoothing is accomplished by using a linear interpolator to interpolate between values associated with two adjacent, vertically oriented intersections of said matrix, and by progressively changing the magnitude of the convergence correction signal in response thereto. Vertical smoothing of the convergence correction signal is accomplished and the vertical discontinuities between groups of scan lines traced by the electron beams are eliminated.

4 Claims, 9 Drawing Figures

DISTORTED RASTER FIELD

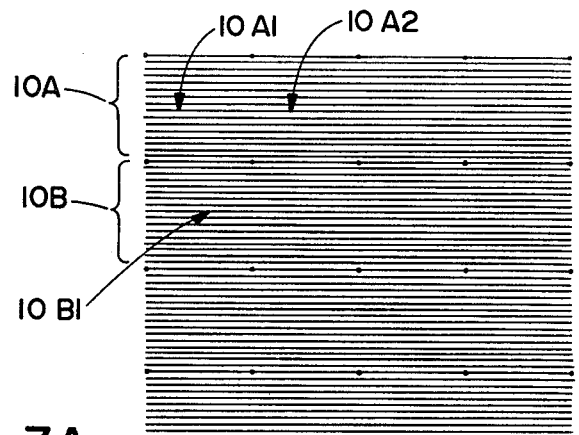
FIG. 3A.
FLAT RASTER FIELD
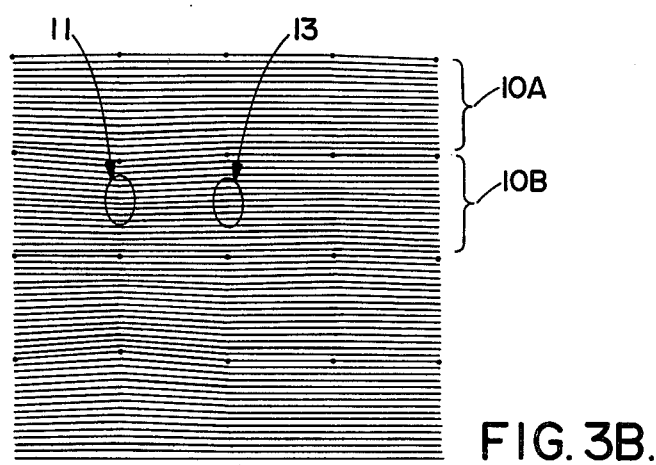
FIG. 3B.
CORRECTED RASTER FIELD
FIG. 3C.
CORRECTION MATRIX VALUES

APPARATUS FOR PROVIDING VERTICAL AS WELL AS HORIZONTAL SMOOTHING OF CONVERGENCE CORRECTION SIGNALS IN A DIGITAL CONVERGENCE SYSTEM

BACKGROUND OF THE INVENTION

1. Field of the Invention

The present invention is directed to a linear interpolator for use in a digital convergence system for providing vertical as well as horizontal smoothing of convergence correction signals.

2. Description of the Prior Art

A display on a cathode ray tube (CRT) comprises a plurality of scan lines disposed thereon. The scan lines are traced along the inner surface of the CRT by electron beams which are generated from within the CRT, the intensity of the electron beams being controlled as the beams are scanned across the inner surface of the CRT, typically from left to right, top to bottom. Since the electron beams are often misconverged during the scan, convergence correction is required in order to ensure that the electron beams, usually three in number, converge together at the proper points along the inner surface of the CRT during their scan thereacross. A digital convergence system provides this convergence correction by synthesizing a convergence waveform, the waveform energizing convergence coils in the neck of the CRT for deflecting one of the electron beams and thereby providing the necessary convergence. A similar convergence waveform energizes said coils for deflecting the other electron beams. The convergence waveform is synthesized in the following manner.

Referring to FIG. 1, the CRT screen is divided into an N by N matrix of blocks 10, each of the blocks having a digital value corresponding thereto. For example, a 16 by 16 matrix could be utilized. The electron beams may scan, for example, from left to right, top to bottom across the blocks along the inner surface of the CRT. When the electron beams begin tracing a first scan line in the first row 10A of the matrix, the first block 10A1 is addressed. A digital value corresponding to said first block 10A1, is generated, the digital value being used to synthesize the convergence waveform. When the electron beams address the next horizontal, adjacent block 10A2 along the first scan line of said first row, another digital value corresponding to said horizontal, adjacent block 10A2, is generated. As the electron beams continue to scan in the remainder of said first scan line of said first row 10A, across other blocks along the inner surface of the CRT, other digital values are generated. Each of the digital values represent a step-function, and each of the digital values are concatenated together. When each of the sequentially generated digital values are concatenated, a voltage waveform is developed associated with said first scan line of said first row 10A. The voltage waveform has a plurality of horizontal discontinuities associated therewith, a horizontal discontinuity being an abrupt increase or decrease in voltage, occurring between each adjacent concatenated step function of the waveform.

Conventional filtering techniques are used to convert each horizontal discontinuity in the voltage waveform into a smooth transition thereby producing a continuous convergence waveform associated with said first scan line of said first row. The continuous convergence waveform energizes the convergence deflection coils in the neck of the CRT for deflecting one of the three electron beams. The other two of the three electron beams are deflected in a similar manner as hereinbefore described thereby converging the three electron beams. The three converged, deflected electron beams produce said first scan line of said first row. One technique for converting each horizontal discontinuity in the voltage waveform into a smooth transition is present in IBM Technical Disclosure Bulletin, Vol. 21, No. 1, June 1978, entitled "CONVERGENCE CORRECTION FOR CRT DISPLAYS," by M. Brandon.

The electron beams retrace to their original position and begin to scan along the second scan line of the first row 10A beginning with the first block 10A1. Another continuous convergence waveform is developed associated with the second scan line in the same manner as hereinbefore described with respect to the first scan line of said first row 10A.

The first and second scan lines are disposed within the same row 10A. Therefore, the same digital values will be generated for each scan line; and the same continuous convergence waveform will be developed for each scan line. As a result, the first and second scan lines will appear to be approximately parallel to one another.

Other continuous convergence waveforms are developed associated with the intermediate scan lines of the first row 10A. When the electron beams begin to trace the last scan line of the first row 10A, beginning with block 10A1, still another convergence waveform is developed in the same manner as hereinbefore described. However, when the electron beams begin to trace the first scan line of the second row 10B, the first block 10B1 of the second row 10B is addressed. The digital values in the blocks of the second row 10B may be different than each of the respective digital values in the blocks of the first row 10A. Since the digital values in the blocks of the second row 10B are different, a different convergence waveform is developed associated with the scan lines in the second row 10B relative to the scan lines in the first row 10A. Consequently, the scan lines of the second row 10B will not appear to be parallel to the scan lines of the first row 10A. The different convergence waveform associated with the scan lines of the second row 10B relative to the first row 10A, and the resultant non-parallel relationship therebetween, results in a visual discontinuity, that is, an abrupt transition between the first row and the second row, and in particular, between the last scan line of the first row 10A and the first scan line of the second row 10B. This abrupt transition is termed a vertical discontinuity.

Reference is directed to FIG. 2 of the drawings wherein a distorted raster field is illustrated. A raster field, by definition, is a plurality of scan lines traced by the electron beams on the inner surface of the CRT, the scan lines being traced within a portion of the matrix of blocks 10 shown in FIG. 1. Since the digital values associated with the blocks of the first row are different than the digital values associated with the blocks of the second row, a vertical discontinuity 12 appears between the last scan line of the first row 10A and the first scan line of the second row 10B. Since the digital values associated with the blocks in the second row 10B are different than the digital values associated with the blocks in a third row 10C, respectively, another vertical discontinuity 14 appears between the last scan line of the second row 10B and the first scan line of the third row 10C. In fact, in FIG. 2, vertical discontinuities appear between each of the rows due to the different respective digital values associated with each of the blocks in each of the rows. The vertical discontinuities (e.g., 12 and 14 in FIG. 2) cannot be filtered using the conventional filtering techniques because these filtering techniques are used to ease the transition between two adjacent points on an output waveform, such as the convergence waveform. Since the digital convergence system of the prior art did not take into account the different digital values associated with each of the blocks of one row relative to the respective blocks of the next adjacent row, the prior art convergence system did not ease the abrupt transition between groups of scan lines disposed in two adjacent rows of the matrix. Therefore, the vertical discontinuities appeared in the raster field, disposed between adjacent rows of the matrix.

These vertical discontinuities do not present a severe problem with respect to a character oriented display as long as the location of each of the characters in the character oriented display is limited to the center of a matrix block. However, for a graphics display, vertical discontinuities can present a severe problem. For example, when generating a pie-chart on a CRT display, if one section of the pie should be filled with a red fill pattern, a distorted raster field, such as that which is illustrated in FIG. 2, having a plurality of vertical discontinuities present therein, may result in gaps in said one section, such as discontinuity 12 of FIG. 2, or in bright red areas in said one section, such as discontinuity 14 of FIG. 2.

SUMMARY

It is therefore a primary object of the present invention to minimize, if not eliminate the above-mentioned disadvantages of the prior art.

It is another object of the present invention to minimize, if not eliminate, the abrupt transition between the last scan line of the row being scanned and the first scan line of the next vertically oriented row of the matrix, which appeared in the raster field of the prior art, by assigning to one scan line in each block of each row of the matrix a value and by interpolating between two adjacent values associated with said one scan line in two adjacent vertically oriented blocks to determine the proper vertical position of the scan lines disposed intermediate said one scan line in said two adjacent vertically oriented blocks thereby taking into account the values associated with the blocks of the next vertically oriented row of the matrix when scanning in the blocks of said row being scanned.

It is still another object of the present invention to minimize, if not eliminate, the abrupt transition between the last scan line of the row being scanned and the first scan line of the next vertically oriented row of the matrix which appeared in the raster field of the prior art by utilizing a circuit embodiment having a minimum of required memory.

It is still another object of the present invention to compensate for variations in the number of scan lines per row of the matrix while minimizing the said abrupt transition.

These and other objects of the present invention are accomplished by assigning to one scan line in each block of each row of the matrix a value. A linear interpolator is used to interpolate between two respective adjacent values associated with a scan line in two adjacent vertically oriented blocks. In response thereto, the linear interpolator generates an output signal, energizing the convergence coils in the neck of the CRT, for deflecting one of the three electron beams. The linear interpolator of the present invention is also used to deflect the other two of the three electron beams. The magnitude of the output signal depends upon the values associated with the scan line in the two adjacent vertically oriented blocks, the number of scan lines to be traced in the row being scanned, and the position of the scan line being traced in the row being scanned. The magnitude of the output signal ultimately determines the vertical position of the scan lines disposed intermediate the one scan lines having assigned thereto said two respective adjacent values. By interpolating between said two adjacent values, the number of scan lines to be traced in the row being scanned will be taken into account, the position of the scan line being traced in the row being scanned will also be taken into account, and therefore the magnitude of the output signal from the linear interpolator will be determined in response thereto. Said vertical position will thereby also be determined. The magnitude of the output signal changes gradually from one scan line of a row being scanned to a corresponding scan line of the adjacent vertically-oriented row. Therefore, a smooth transition takes place between the one scan line of the row being scanned and the corresponding scan line of the adjacent vertically oriented row.

The above objects are also accomplished by utilizing a compensating apparatus to compensate for variations in the number of scan lines being traced in each row of the matrix. In the preferred embodiment, a minimum of memory space is utilized, in that, a single Random Access Memory (RAM) is utilized to store the said values therein associated with the one scan line per each block of each row.

Further scope of applicability of the present invention will become apparent from the description given hereinafter. However, it should be understood that the details of the description and the specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

A full understanding of the present invention will be obtained from the detailed description given hereinbelow and the accompanying drawings which are given by way of illustration only, and thus are not limitative of the present invention, and wherein:

FIG. 3a illustrates a flat raster field, the desired result the present invention is attempting to achieve;

FIG. 3b illustrates a corrected raster field, the actual result the present invention actually achieves;

FIG. 3c illustrates a matrix of values corresponding to the matrix of blocks, respectively, shown in FIG. 1;

FIG. 4a illustrates one embodiment of the linear interpolator of the present invention including the compensating apparatus for compensating for variations in the number of scan lines being traced in each row of the matrix shown in FIG. 1;

FIG. 4b illustrates timing diagrams representing the voltages present within the compensating apparatus shown in FIG. 4a;

DETAILED DESCRIPTION OF THE DRAWINGS

A full appreciation of the results achieved by virtue of the present invention will be obtained by reference to FIGS. 3a–3c of the drawings.

Figure 1:
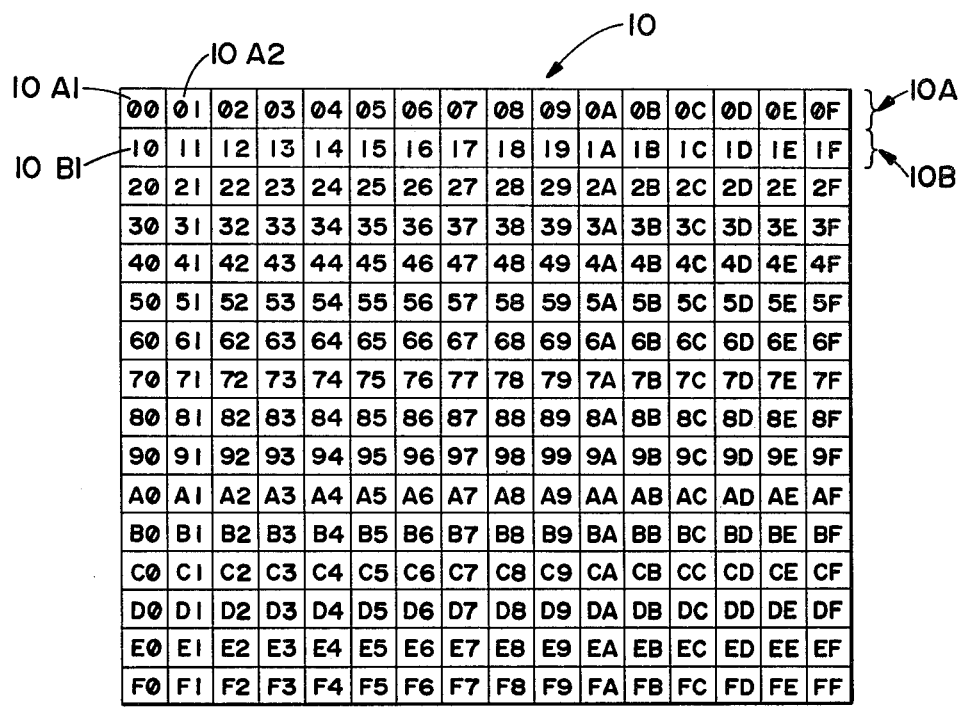
FIG. 1 illustrates the manner by which the screen of the CRT is divided into a matrix of blocks, each of the blocks having a digital value corresponding thereto.

In FIG. 3a, another raster field is illustrated, the electron beams producing the scan lines of said another raster field tracing the scan lines within a portion of the matrix of blocks 10, shown in FIG. 1. A plurality of flat scan lines are shown within each of the rows 10A and 10B of the raster field. As a result, there are no horizontal discontinuities present. In addition, since there are no abrupt transitions between the row being scanned and the next adjacent row of the matrix, there are no vertical discontinuities present in the raster field of FIG. 3a. In fact, FIG. 3a illustrates the desired results the present invention is attempting to achieve, that is, the total absence of any horizontal or vertical discontinuities.

Referring to FIG. 3b, a further raster field is illustrated. A plurality of scan lines are traced by electron beams on the inner surface of a CRT within the matrix of FIG. 1, FIG. 3b illustrates a corrected raster field, the actual result the present invention actually achieves. Although the scan lines in each row of the matrix of FIG. 3b are not perfectly flat, a transition from one block to a next adjacent horizontally disposed block along one scan line is comparatively smooth. For example, transitions 11 and 13, shown in FIG. 3b, are comparatively smooth. In addition, since there are no abrupt transitions between rows, e.g., between rows 10A and 10B, there are no visible vertical discontinuities present in the raster field of FIG. 3b. The substantial absence of vertical discontinuities in the raster field of FIG. 3b represents the actual result achieved by the linear interpolator of the present invention.

Referring to FIG. 3c, one scan line in each block of each row is assigned a value. The linear interpolator of the present invention stores these values therein. In accordance with these values stored therein, the linear interpolator generates an output signal in response thereto, the output signal energizing the convergence coils in the neck of the CRT to deflect one of the three electron beams. Linear interpolators are also used for generating output signals to deflect the other two electron beams. The combined effect of these deflections is to minimize the visual effect of the vertical discontinuities. However, it is the magnitude of the output signal which determines the degree of convergence required to minimize the visual effects of the vertical discontinuities.

When the electron beams in the CRT are tracing said one scan line in one block of one row of the matrix, an output signal is generated from the linear interpolator in response thereto, the magnitude of which is a function of the value assigned to said block. However, the magnitude of the output signal varies depending upon the particular scan line being traced in the row being scanned. More particularly, the magnitude varies depending upon the number of scan lines to be traced in the row being scanned and the position of the scan line being traced in the row being scanned. In order to determine the magnitude of the output signal to be generated from the linear interpolator when the electron beams are tracing the scan lines disposed intermediate the one scan lines of two adjacent vertically oriented blocks, the linear interpolator of the present invention interpolates between the values associated with said two adjacent vertically oriented blocks. As a result of the interpolation, the magnitude of the output signal changes gradually as the electron beams trace the scan lines disposed intermediate the one scan lines. The magnitude ranges from the magnitude of the output signal when tracing said one scan line of one block to the magnitude of the output signal when tracing said one scan line of the next adjacent vertically oriented block. Further, as a result of the gradual change in the magnitude of the output signal generated from the linear interpolator, as the scan lines associated with two adjacent vertically oriented rows of the matrix are being traced, a smooth transition takes place between the scan lines of the row being scanned and the scan lines of the next vertically oriented row of the matrix.

For example, referring to FIG. 3c, the first scan line of the first block 10A1 of the first row 10A is assigned the value 0. The first scan line of the second block 10A2 of the first row 10A is assigned the value 0.5. The first scan line of the first block 10B1 of the second row 10B is assigned the value 0. The first scan line of the second block 10B2 of the second row 10B is assigned the value −1.0. When the electron beams trace the first scan lines in the second blocks 10A2 and 10B2, the magnitude of the output signal from the linear interpolator is determined by the values assigned to the first scan lines, that is, 0.5 and −1.0. When tracing the scan lines disposed between the first scan lines of the second blocks 10A2 and 10B2, the magnitude of the output signal from the linear interpolator is determined by interpolating between the values associated with said first scan lines, i.e., between 0.5 and −1.0. As a result of the interpolation, the output signal from the linear interpolator, associated with the last scan line of the first row 10A, is approximately equal to the output signal from the linear interpolator associated with the first scan line of the second row 10B. The output signal energizes the convergence coils in the neck of the CRT for deflecting one of the electron beams. A similar deflection of the other two electron beams takes place using linear interpolators of the present invention. Therefore, the degree of convergence of the electron beams tracing the last scan line of the first row is approximately equal to degree of convergence of the electron beams tracing the first scan line of the second row. Consequently, there is a smooth transition with respect to the scan lines being traced in the first and second rows 10A and 10B, that is, no substantially noticeable vertical discontinuity exists between the first and the second rows. Since the interpolation takes place within and between each of the rows of the matrix, no substantially noticeable vertical discontinuity exists between any of the adjacent rows of the matrix, as can be seen in FIG. 3b.

The technique described hereinabove for eliminating the vertical discontinuities between rows, is performed by the embodiment of invention shown in FIG. 4a of the drawings.

Figures 4A, 4B:
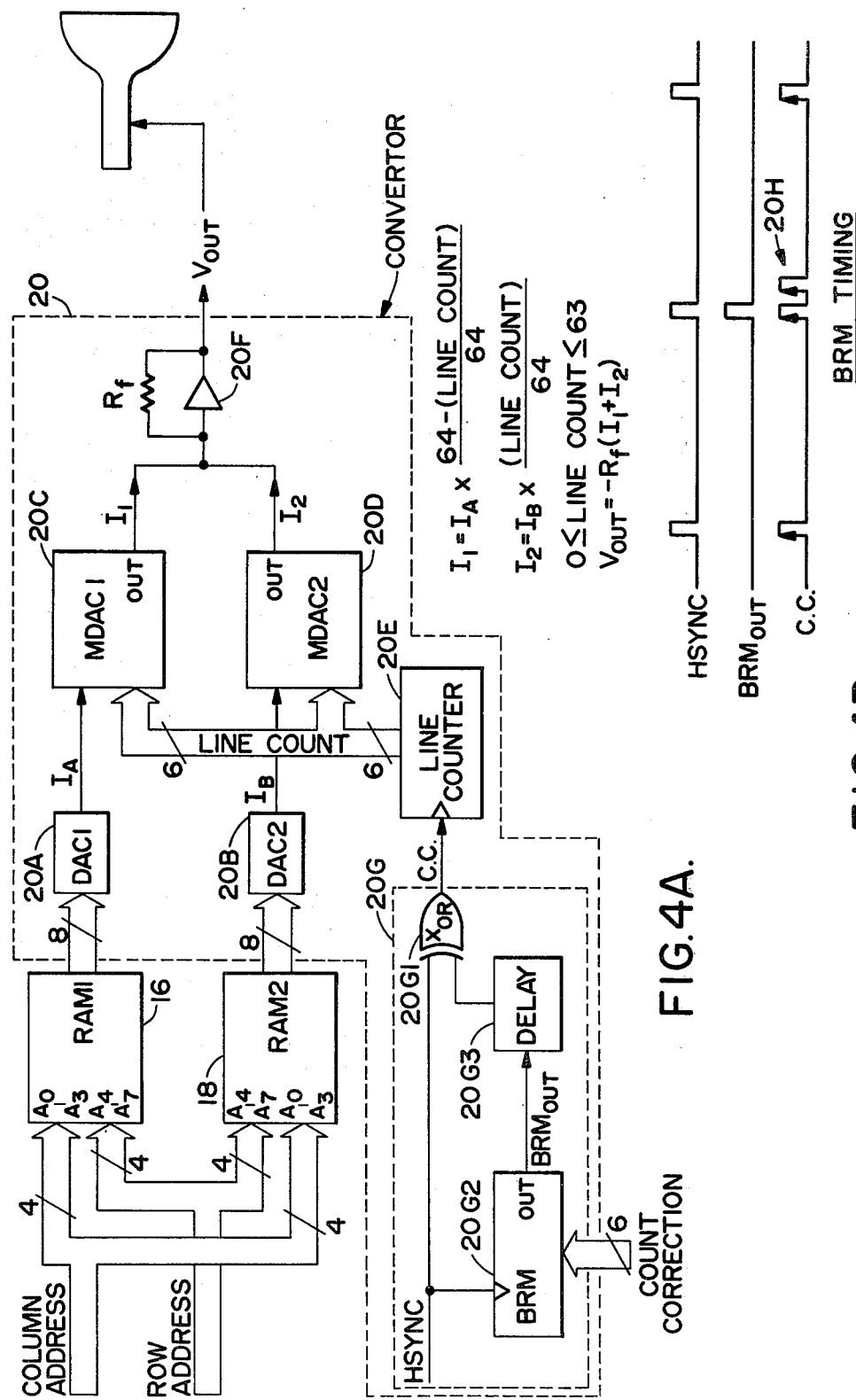

Referring to FIG. 4a, as the electron beams scan from left to right, top to bottom, across the matrix of blocks 10 shown in FIG. 1, column address data and row address data is generated in response thereto. The column address data and row address data is applied to a first random access memory 16 and a second random access memory 18. The first random access memory 16 stores therein the digital values associated with the first scan lines in each block of each row of the matrix 10 shown in FIG. 1. For example, referring to FIG. 3c, RAM 16 stores the digital values 0. 0.5, 0.5, 0.5, and 0 associated with the first scan line in the first five blocks of the first row 10A of the matrix, these digital values being stored in locations identified by specific address data, for example, address data 11, 12, 13, 14, and 15, respectively.

The second RAM 18 receives the same column and row address data which was received by the first RAM 16. In addition, the second RAM 18 stores the same digital values therein as is stored in the first RAM 16. For a particular row address, the first RAM 16 stores therein the digital values associated with the first scan line of said particular row. However, the second RAM 18 stores therein the digital values associated with the first scan line of the next subsequent row following said particular row of the matrix 10. Using the above example, and referring to FIG. 3c, in the locations designated by address data 11, 12, 13, 14, and 15, the second RAM 18 stores therein the digital values associated with the first scan line in the first five blocks of the second row 10B, that is, 0, −1.0, 0, 0, and 0, respectively. Consequently, when the first RAM 16 is addressed by data indicating a first row and a second column, the first RAM 16 will generate an output signal in digital form indicative of the value 0.5. However, the second RAM 18, for this same address data, will generate an output signal in digital form indicative of the digital value −1.0 (the digital value actually residing in the second row, the second column).

The output signals from the first RAM 16 and the second RAM 18 energize a converter 20.

The converter 20 further includes a first D to A converter (DAC1) 20A and second D to A converter (DAC2) 20B. The first DAC 20A receives the output signal from the first RAM 16, and the second DAC 20B receives the output signal from the second RAM 18. The first and second DACs 20A and 20B, respectively, convert the digital output signals from the first and second RAMs 16 and 18, into analog signals, $I_A$ and $I_B$, respectively, representative thereof. A first multiplying D to A converter (MDAC1) 20C receives the analog signal ($I_A$) from the first DAC 20A. A second multiplying D to A converter (MDAC2) 20D receives the analog signal ($I_B$) from the second DAC 20B. The first and second MDAC's 20C and 20D are essentially digitally controlled variable resistors and may be identified by an industry standard part No. DAC-08.

Each of the MDAC's 20C and 20D receive an output signal from a line counter 20E, the line counter maintaining a count indicative of the number of the scan line currently being traced in the row of the matrix being scanned, the output signal generated therefrom being representative thereof. The line counter 20E is connected to a horizontal sync pulse generator, one horizontal sync pulse being generated for each scan line in each row of the matrix. Each time a horizontal sync pulse is generated, the line counter is incremented by 1. For example, if the system traces 64 scan lines in each row of the matrix shown in FIG. 1, when the last scan line of any one row is traced, the line counter 20E should indicate a value of 64. The output signal from the line counter 20E, indicative of the number of the scan line currently being traced in the row being scanned, energizes MDAC1, 20C, and MDAC2, 20D. In addition, analog signals $I_A$ and $I_B$ energize MDAC1 and MDAC2, respectively. The MDAC's 20C and 20D generate output signals I1 and I2, respectively, in response thereto.

The function of each of the MDACs 20C and 20D can best be understood by reference to the following equations which relate the output signals I1 and I2 as a function of (1) the analog signals $I_A$ and $I_B$, and (2) the line count of the line counter 20E:

$$I_1 = I_A \times \frac{64 - \text{(line count)}}{64}$$

$$I_2 = I_B \times \frac{\text{(line count)}}{64};$$

where $0 \leq$ line count $\leq 63$.

It should be noted that the MDAC1 and MDAC2, 20C and 20D, operate only in conjunction with a display system which traces 64 scan lines in each row of the matrix shown in FIG. 1. Therefore, referring to the above equations, when the first scan line of a row is being traced, the current I1 generated from MDAC1 is maximum, and the current I2 generated from MDAC2 is minimum. However, when the system is tracing the last scan line of said row, the 64th scan line, the current I1 is 0, and the current I2 is maximum. When the intermediate scan lines in a row are being traced, the current I1 gradually decreases in magnitude, and the current I2 gradually increases in magnitude until the last scan line in the row is encountered.

The outputs of each of the MDACs 20C and 20D are connected together at a junction point in order that the currents I1 and I2, generated from each of the MDACs, may be summed together. At the junction point, an operational amplifier 20F is connected thereto. This operational amplifier amplifies the current appearing at the junction point in the following manner; $V_{out} = -R_F(I_1+I_2)$, where $R_F$ is a feedback resistor, $V_{out}$ is the voltage energizing the convergence coils, and $(I_1+I_2)$ is the current at the above-mentioned junction point.

In the above paragraphs, it was stated that the output currents I1 and I2 from the first and second MDACs 20C and 20D are each a function of the line count, that is, the count of the line counter 20E. However, by definition, the line count varies between 0 and 63 indicative of a system which generates 64 scan lines in each row of the matrix of FIG. 1. It is therefore evident that the MDAC's, 20C and 20D, function properly only when the line counter 20E indicates a value "64" when the last scan line for any one row is being traced. However, some display systems do not inherently trace 64 scan lines in any one row of the matrix shown in FIG. 1. Consequently, compensating circuitry is needed in order to ensure that the output of the line counter 20E indicates a value of "64" when the last scan line of a row of the matrix shown in FIG. 1 is being traced.

Therefore, the converter 20 further includes compensating circuitry 20G connected to the line counter 20E. The compensating circuitry 20G is responsive to a horizontal line sync pulse, one horizontal line sync pulse being generated each time a scan line is traced within the matrix of blocks shown in FIG. 1. The horizontal line sync pulses energize one input terminal of an exclusive OR gate 20G1. The horizontal line sync pulse also energizes a binary rate multiplier 20G2. The binary rate multiplexer 20G2 may be identified by industry standard part No. 7497. The binary rate multiplier 20G2 is also responsive to a count correction signal (COUNT CORRECTION). The output of the binary rate multiplier 20G2 is connected to a delay circuit 20G3, the delay circuit delaying the output signals appearing at the output terminal (BRM out) of the binary rate multiplier. The delay circuit 20G3 is connected to another input terminal of the exclusive OR gate 20G1. The output (CC) of the exclusive OR gate 20G1 is connected to the line counter 20E.

The binary rate multiplier 20G2 functions in the following manner: if 64 horizontal line sync pulses are applied to the binary rate multiplier 20G2 for any one row of the matrix shown in FIG. 1 (indicative of 64 scan lines per row), the binary rate multiplier output ($BRM_{out}$) will include anywhere from 0 to 64 pulses, depending upon the magnitude of the count correction signal (COUNT CORRECTION). In this case, if the count correction signal is set at 0, no pulses will be generated at the output terminal ($BRM_{out}$) of the binary rate multiplier 20G2. In this example, the binary rate multiplier 20G2 provides no function. The 64 horizontal line sync pulses simply pass through the exclusive OR gate 20G1, and are applied to the line counter 20E. However, if, instead of 0, the count correction signal represents the number "64", and if 64 horizontal line sync pulses are applied to the binary rate multiplier 20G2 while tracing scan lines within any one row of the matrix, the output signal ($BRM_{out}$) of the binary rate multiplier 20G2 would include 64 sync pulses. When these 64 sync pulses are applied to another input terminal of the delay circuit 20G3, each sync pulse is delayed by a certain factor. Therefore, 64 delayed sync pulses are generated by the delay circuit. These 64 delayed sync pulses are applied to the exclusive OR gate 20G1. If the count correction signal represents a number between "0" and "64," and 64 horizontal line sync pulses are applied to the binary rate multiplier 20G2, the output signal ($BRM_{out}$) of the binary rate multiplier 20G2 would include a certain number of pulses, said certain number being a number corresponding to the number represented by the count correction signal.

Referring to FIG. 4b, if a horizontal line sync pulse is applied to one terminal of the exclusive OR gate 20G1, and if, subsequently to the application of said sync pulse to said one terminal, a delayed sync pulse from the delay circuit 20G3 is applied to the other terminal of the exclusive OR gate 20G1, a double pulsing effect takes place, wherein the exclusive OR gate generates a double pulse in response thereto. Referring to FIG. 4b, a double pulse 20H can be seen in FIG. 4b. Each double pulse, generated from the exclusive OR gate 20G1, increments the line counter 20E by a factor of 2, in lieu of a factor of 1, when a single pulse is applied thereto. As a result of the double pulsing effect, the line counter 20E increments its count at a rate faster than the rate at which the count of the line counter 20E is incremented in the absence of the double pulsing effect.

For example, if the display system generates 32 scan lines per row, there will be 32 horizontal sync pulses generated for any one row of the matrix of FIG. 1. The 32 sync pulses are applied to the binary rate multiplier 20G2. Depending upon the magnitude of the count correction signal, the binary rate multiplier will generate a particular number of pulses, each of the particular number of pulses being generated in synchronism with one of the 32 horizontal sync pulses. The particular number of pulses generated by the binary rate multiplier are each delayed via the delay circuit 20G3. Therefore, one input of the exclusive OR gate will be energized by the 32 sync pulses (per row of the matrix). The other input of the exclusive OR gate will be energized by a particular number of delayed pulses. Therefore, a particular number of double pulses will appear at the output of the exclusive OR gate 20G1 corresponding to the particular number of delayed pulses appearing at the input terminal thereof. As a result, the line counter 20E will be incremented at a faster rate in direct proportion to said particular number of delayed pulses. This ensures that the output signal generated from the line counter 20E represents the value 64, in lieu of 32, when the last scan line of any one row is traced.

Therefore, as a result of the function of the compensating circuitry 20G, regardless of the number of scan lines per row of the matrix actually traced by the display system, the output signal from the line counter 20E can be assured to be a value 64, when the last scan line of any one row of the matrix FIG. 1 is traced.

The embodiment of invention shown in FIG. 4a operates in the following manner. As stated in the paragraphs hereinabove, the electron beams in the CRT scan from left to right, top to bottom, across the inner surface thereof tracing a first scan line of the first row 10A of the matrix 10 shown in FIG. 1. When one scan line is completed, the electron beams retrace to the original left-most position on the inner surface of the CRT, and trace a second scan line. A certain specified number of scan lines are traced prior to tracing the last scan line of the first row 10A, within the matrix of blocks 10 shown in FIG. 1. After retrace, the electron beams trace the first scan line of the second row 10B across the inner surface of the cathode ray tube.

As the electron beams trace from left to right, row and column address data is continually generated indicative of the row and the column of the matrix 10 in which the electron beam is conducting the trace. This row and column address data is applied to both the first random access memory 16 and the second random access memory 18. In response to this address data, the first random access memory (RAM 1) 16 generates a digital output signal indicative of a digital value associated with the block of the row being scanned by the electron beam. The second random access memory (RAM 2) 18, in response to the same address data, generates a digital output signal indicative of a digital value associated with the same corresponding block of the next subsequent row relative to the row being scanned. For example, with reference to FIG. 3c, if the row and column address data indicates that the second block 10A2 of the first row 10A is being scanned, RAM1 16 will generate an output signal indicative of the value 0.5, the digital value associated with the second block 10A2 of the first row 10A. However, in response to the same row and address data, RAM2 18 will generate an output signal indicative of the value −1.0, the digital value associated with the second block 10B2 of the second row 10B.

The digital outputs of RAM1 and RAM2, 16 and 18, are applied to a converter 20, the converter 20 including DACs 20A and 20B for converting the digital outputs to analog signal IA and IB, respectively. These analog signals IA and IB energize one input terminal of the two multiplying D to A convertors, MDAC1 20C and MDAC2 20D, respectively. As long as the electron beam scan remains within one row of the matrix, the same analog signals $I_A$ and $I_B$ will energize the one input terminal of MDAC1 20C and MDAC2 20D. In addition, if the display system being used traces a total of 64 scan lines per row of the matrix shown in FIG. 1, when a scan line is completed within said one row, the line counter 20E is incremented by "one". The other input terminal of MDAC1 20C and MDAC2 20D receives the incremented count from the line counter 20E. Since the analog signals $I_A$ and $I_B$ applied to the one input terminal of MDAC1 and MDAC2 do not change when the electron beam scan remains within said one row, and since the line count in the line counter 20E increases for each scan line, as long as the electron beam scan remains within said one row, the output current $I_1$ from MDAC1 20C will gradually decrease, however, the output current $I_2$ from MDAC2 20D will gradually increase. The two output currents $I_1$ and $I_2$ are added together at the output of the MDACs 20C and 20D and are amplified within the amplifier 20F. A resultant gradually changing output voltage, $V_{out}$ is applied to the convergence coils in the neck of the CRT for gradually deflecting one of the electron beams conducting the scan. Each of the other two electron beams are gradually deflected in the same manner. As a result, a gradual expansion or compression of the scan lines in said one row of the matrix takes place along a vertical direction in order to avoid the appearance of an abrupt transition, a vertical discontinuity, between rows.

Figure 2:
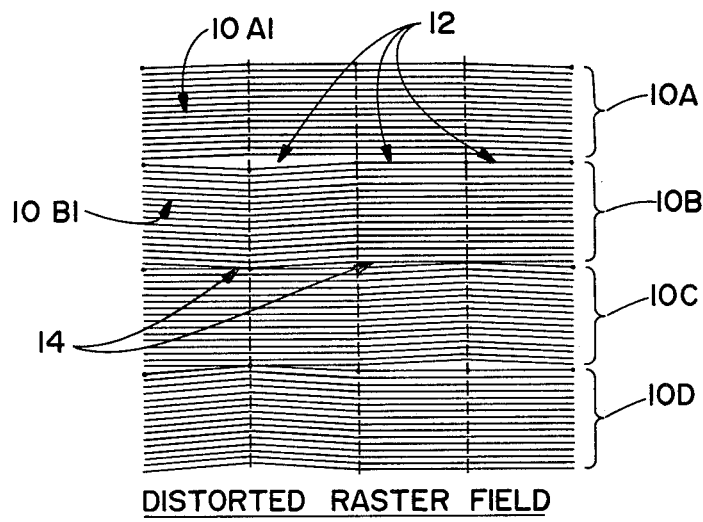
FIG. 2 illustrates a raster field of the prior art within a portion of the matrix of blocks shown in FIG. 1, wherein a vertical discontinuity appears between each of the rows of the raster field.

The next subsequent scan line represents the first scan of the next subsequent row. When the last scan line of the previous row was traced, the current $I_2$, output from MDAC2, was at a maximum. However, when the trace of the first scan line of the next subsequent row is initiated, the magnitude of the current $I_1$, output from MDAC1, becomes approximately equal to the magnitude of the current $I_2$ which was generated during the trace of the last scan line of the previous row. As before, as the electron beam traces through the 64 scan lines within this next subsequent row, the magnitude of the current $I_1$ gradually decreases, and the magnitude of the current $I_2$ gradually increases. Another gradual vertical spreading (expansion or compression) of the scan lines in said next subsequent row takes place. This vertical spreading of each of the scan lines in a row actually represents an accordian-like vertical spreading (compressing or expansion) of the scan lines in a row, such as said one row and said next subsequent row. For example, with respect to the first row 10A in FIG. 2, the present invention accomplishes an accordian-like vertical expansion to take into account the gap between the first row 10A and the second row 10B, that is, to eliminate or minimize the vertical discontinuity 12. With respect to the second row 10B, the present invention accomplishes an accordian-like vertical compression to take into account the overlap which appears between the second row 10B and the third row 10C to thereby eliminate or minimize the vertical discontinuity 14 shown in FIG. 2. With respect to the third row 10C, another accordian-like vertical compression takes place, in order to take into account the overlap which appears between the third row 10C and the fourth row 10D of FIG. 2. With respect to the fourth row 10D of FIG. 2, an accordian-like vertical expansion takes place, whereby the last scan line of the fourth row 10D of FIG. 2 is relatively flat in its visual appearance.

If the display system does not trace 64 scan lines per row, the compensating circuitry 20G will ensure that, when the last scan line of any one row is traced, the line counter 20E records a value of "64". By carefully selecting the magnitude of the count correction signal (COUNT CORRECTION) energizing the binary rate multiplier 20G2, just enough double pulsing takes place at the output (CC) of the exclusive OR gate 20G1 to increment the line counter 20E at a more rapid rate, and to thereby ensure that the line counter 20E indicates a value "64" when the last scan line of a row is traced. The exact, required magnitude of the count correction signal is determined by referring to a look-up table or using a particular formula to calculate the exact, required magnitude.

Figure 5A:
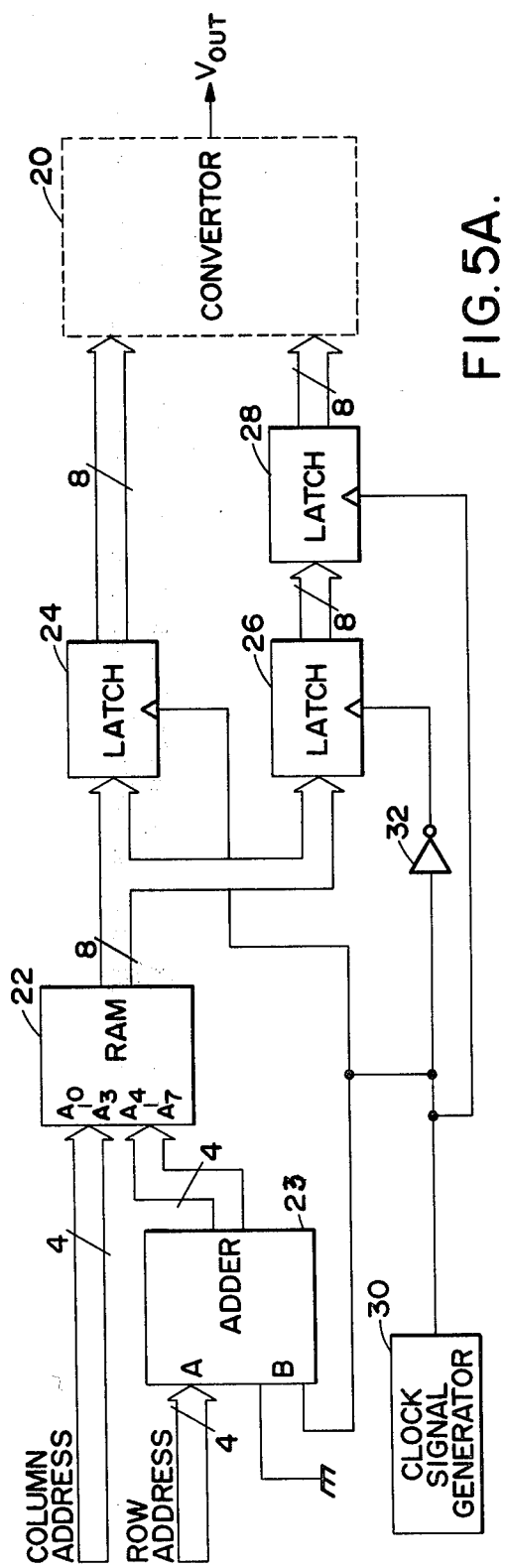
FIG. 5a illustrates the preferred embodiment of the linear interpolator of the present invention.

Referring to FIG. 5a, a preferred embodiment of the present invention is illustrated. In lieu of two RAMs utilized in FIG. 4a, a single RAM 22 is utilized in this preferred embodiment. Consequently, in view of the elimination of the other, second RAM, a simpler circuit configuration is used.

Figure 5B:
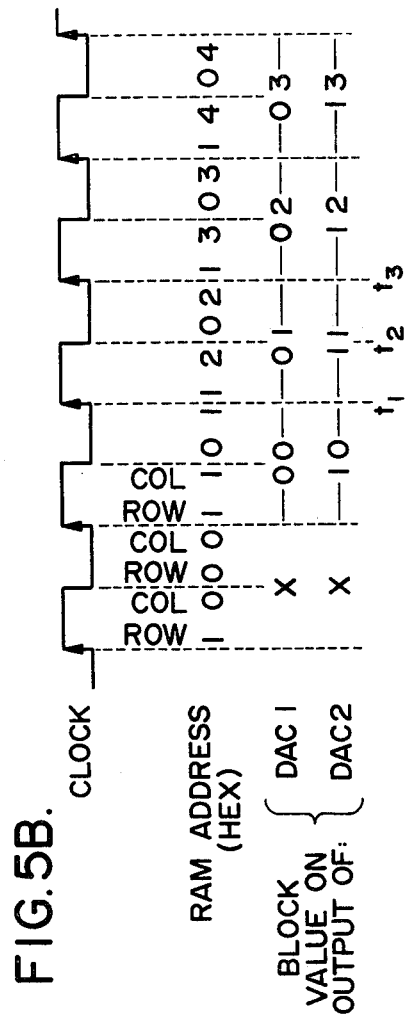
FIG. 5b illustrates a clock signal utilized to drive the embodiment of FIG. 5a, and additional data associated therewith.

FIG. 5b illustrates the clock signal generated by the clock signal generator 30, the RAM address associated with each cycle of the clock signal and the output value of the first and second DAC's 20A and 20B within the converter 20, for each cycle of the clock signal.

In FIG. 5a, the row and column address data is generated as hereinbefore described. However, the column address data addresses a single RAM 22. The row address data also addresses the single RAM 22 via an adder 23. The RAM 22 is connected to a first latch circuit 24. The RAM 22 is also connected to a second latch circuit 26. The second latch circuit is connected, at its output thereof, to a third latch circuit 28. A clock signal is generated from a clock signal generator 30 and is the data for one input terminal of the adder 23. The clock signal also enables the first latch circuit 24. The clock signal further enables the third latch circuit 28. The clock signal generator 30 is connected to the second latch circuit 26 via an inverter 32. When the clock signal is generated, the second latch circuit 26 is not enabled. When no clock signal is generated, the latch circuit 26 is enabled. The outputs of the first and third latch circuits 24 and 28 are connected to the converter 20, the converter 20 being illustrated in FIG. 4a and described in detail in the paragraphs provided hereinabove.

The RAM 22 stores the digital values therein associated with the first scan lines of each block in each row of the matrix 10 shown in FIG. 1. These values are stored in locations identified by row and column address corresponding to the rows and columns of the matrix 10 of FIG. 1. For example, the first row, second column, has a value 0.5 stored in the RAM 22, this value being indicative of and representative of the first scan line of the second block 10A2 of the first row 10A.

The latches (24, 26, and 28) are positive edge triggered. Latch 24 and 28 respond to the rising edge of the clock signal. Latch 26 responds to the falling edge of the clock due to the inversion of the clock signal by inverter 32.

In operation, referring to FIG. 5b in association with FIG. 5a, a given row and column address is generated when the clock signal is high. At time $t_1$, the row and column address is 02 (row 0, column 2). The adder (23) sums the clock level (1) with the row address to yield an address of 12 for the RAM (22). At time $t_2$, the value stored in RAM at this address is latched into latch (26)

due to the falling edge of the clock. The clock level is row 0, so the RAM address is row 02. At time $t_3$, the value stored in RAM at this address is latched into latch (24) at the same time the data stored in latch 26 is latched into latch 28. The result of this action is that DAC1 is presented with the data for block 02 at the same time DAC2 is presented with the data for block 12. At this point, the functional operation of the circuit shown in FIG. 5a is the same as the functional operation of the circuit shown in FIG. 4a of the drawings, as previously described hereinabove.

The invention being thus described, it will be obvious that the same may be varied in many ways. Such variations are not to be regarded as a departure from the spirit and scope of the invention and all such modifications as would be obvious to one skilled in the art are intended to be included within the scope of the following claims.

I claim:

1. An interpolator for use in a convergence system, said convergence system developing convergence correction signals for deflecting an electron beam while scanning across the inner surface of a cathode ray tube, the surface of said cathode ray tube being subdivided into a matrix including a plurality of intersecting rows and columns, each row and each column having an address associated therewith, said electron beam tracing within one of the rows and across said columns of said matrix while scanning across the inner surface of said tube, a row address signal and a column address signal being developed corresponding to the address of the row and the column in which said electron beam is scanning, a certain number of scans of said electron beam are actually traced within each of said rows of said matrix, a horizontal sync signal being produced for each of said scans, comprising:

storing means for storing a plurality of values therein corresponding, respectively, to a plurality of intersections associated with the plurality of intersecting rows and columns of said matrix, said storing means generating a first output signal indicative of one of said values associated with one of said intersections and generating a second output signal indicative of another of said values associated with the next, adjacent, vertically oriented intersection relative to the one intersection in response to said row address signal and said column address signal;

converter means responsive to said first and said second output signal from said storing means for developing said convergence correction signal, said convergence correction signal having a signal parameter which changes linearly ranging from a first signal parameter corresponding to said first output signal from said storing means to a second signal parameter corresponding to said second output signal from said storing means, the degree of deflection of said electron beam being proportional to the linear change of said signal parameter associated with said convergence correction signal; and compensating means responsive to the certain number of said horizontal sync signals for each of said rows of said matrix for developing an output signal indicative of a particular number when the last of said certain number of scans is traced within each of the rows of said matrix, said particular number representing a desired number of scans to be traced by said electron beam within each of said rows of said matrix;

said converter means developing said convergence correction signal in response to said output signal from said compensating means and to the first and second output signals from said storing means.

2. The interpolator of claim 2 wherein said converter means comprises:

line counter means responsive to said horizontal sync signal for maintaining a count indicative of the number of the scan currently being traced by said electron beam within a said row of the matrix;

first means responsive to said count and to said first output signal from said storing means for developing a first signal, the magnitude of said first signal being a function of said count and said first output signal;

second means responsive to said count and to said second output signal from said storing means for developing a second signal, the magnitude of said second signal being a function of said count and said second output signal, the magnitude of said first signal decreasing as the count of said line counter means increases, the magnitude of said second signal increasing as the count of said line counter means increases, an output terminal of said first means developing said first signal being connected, at a junction, to an output terminal of said second means developing said second signal, said first signal being added to said second signal at said junction to produce a summed signal; and means responsive to said summed signal for producing said convergence correction signal, said convergence correction signal being a function of said summed signal.

3. The interpolator of claim 1 wherein said compensating means includes:

binary rate multiplier means energized by the horizontal sync signal for generating a plurality of equally spaced pulses in its output signal in response to a count correction signal that is representative of the difference the selected number scans within each row and the maximum number of scans expected within each row;

delay means for delaying the output signal pulses from the binary rate multiplier means; and exclusive-or means coupled to receive the horizontal sync signal and the delayed pulses for delay means for causing the signal parameter of the converter means to change in response to both the horizontal sync signal and the delayed pulses.

4. The interpolator of claim 3 wherein said converter means comprises:

line counter means responsive to the output signal from the exclusive-or means for maintaining a count indicative of the number of the scan currently being traced by said electron beam within a said row of the matrix;

first means responsive to said count and to said first output signal from said storing means for developing a first signal, the magnitude of said first signal being a function of said count and said first output signal;

second means responsive to said count and to said second output signal from said storing means for developing a second signal, the magnitude of said second signal being a function of said count and said second output signal, the magnitude of said first signal decreasing as the count of said line counter means increases,
the magnitude of said second signal increasing as the count of said line counter means increases,
an output terminal of said first means developing said first signal being connected, at a junction, to an output terminal of said second means developing said second signal, said first signal being added to said second signal at said junction to produce a summed signal; and
means responsive to said summed signal for producing said convergence correction signal, said convergence correction signal being a function of said summed signal.

* * * * *

UNITED STATES PATENT AND TRADEMARK OFFICE
CERTIFICATE OF CORRECTION

PATENT NO. : 4,422,019

DATED : December 20, 1983

INVENTOR(S) : William W. Meyer

It is certified that error appears in the above—identified patent and that said Letters Patent is hereby corrected as shown below:

Col. 14, line 42 which reads "the difference the selected" should read --the difference between the selected--

Signed and Sealed this

Ninth Day of October 1984

[SEAL]

Attest:

GERALD J. MOSSINGHOFF

Attesting Officer

Commissioner of Patents and Trademarks